Feb. 17. 1925.

E. H. MEDÉN 1,526,923

TIP FOR WELDING BLOWPIPES

Filed March 18, 1920

WITNESSES:

Gustav Gemfinger.

INVENTOR

Elof H. Medén
BY
Cyrus N. Anderson
ATTORNEY

Patented Feb. 17, 1925.

1,526,923

UNITED STATES PATENT OFFICE.

ELOF H. MEDÉN, OF SHORT HILLS, NEW JERSEY, ASSIGNOR TO AMERICAN GAS-ACCUMULATOR COMPANY, OF ELIZABETH, NEW JERSEY, A CORPORATION OF NEW JERSEY.

TIP FOR WELDING BLOWPIPES.

Application filed March 18, 1920. Serial No. 366,834.

*To all whom it may concern:*

Be it known that I, ELOF H. MEDÉN, a subject of the King of Sweden, and a resident of Short Hills, in the county of Essex and State of New Jersey, have invented an Improvement in Tips for Welding Blowpipes, of which the following is a specification.

My invention relates to tips for welding blow pipes, also referred to in the art as welding torches, and its object generally stated is to provide a new and novel improved means for conducting and mixing the gases, for instance oxygen and acetylene, in tips which are readily removable and interchangeable.

Particularizing with respect to the objects of my invention, it may be stated that one of its primary purposes is to provide a tip so constructed that the oxygen or other noncombustible gas (oxygen being hereinafter referred to as a non-combustible gas) will surround the inner member of the tip through which acetylene or other combustible gas flows, and insulate the same from the external heat of the outer member of the tip. Such an arrangement, particularly as the insulating gas, such as oxygen, is flowing through the elongated annular chamber which surrounds the inner member of the tip, maintains the tip in a relatively cool condition, particularly the inner portion thereof which constitutes the conduit for the passage of the combustible gas. This is an important feature of the construction because thereby the likelihood of the occurrence of back flash is reduced.

The occurrence of back flash in connection with welding blow pipes or torches may result from various causes, but one of the causes for such occurrence is that of restriction of the flow of the gases from their point of admixture outwardly. In such case the flame is apt to burn back to the point of admixture and it is desirable in such case that the construction shall be such that the flame will be extinguished quickly or automatically. The arrangement of the passageway through the tip at and about the point of mixture of the gases therein is such that in case the flame should burn back into the tip it will become automatically extinguished.

Such back flash is likely to injure or destroy the usefulness of the tip and for that reason it is desirable that the tip shall be interchangeable; that is, may be removed and another tip substituted therefor without interfering with or in any way injuring the head part of the device upon which the tip is supported.

Back flash may also occur as a result of excessive heat conducted and radiated to the combustible, usually complex, gas, raising the same to a temperature sufficient to cause dissociation thereof. Such dissociation may also be initiated by a flash back resulting from a restricted flow as above described. In the case of a combustible gas, such as acetylene, dissociation thereof develops extremely high temperatures and pressures and as its velocity of propagation is very high, it travels almost or practically instantaneously through the blow pipe, the hose and the pressure regulator to the container. Such back flash generally is destructive to the blow pipe and occasionally results in serious damage to life and property.

It is the object of my invention to provide a construction which will obviate, as far as is practically possible, the occurrence of back flash, and generally stated this object is accomplished by providing a tip of a construction such that the gases are mixed together at points in rear of but near the forward end thereof. By so constructing the tip the combustible gas, throughout its passage through the tip to its point of admixture with the non-combustible gas, is surrounded by a film of the latter, which, by reason of the continuous delivery of a new supply, is maintained in a relatively cool condition, which prevents the combustible gas from being raised to a temperature at which dissociation will be effected spontaneously. It will be understood, however, that the combustible gas is pre-heated to some extent and that such pre-heating thereof, as well as the pre-heating of the surrounding non-combustible gas, such as oxygen, increases the efficiency of the action of the blow pipe.

It is also an object of my invention to provide a tip of a construction wherein and whereby a very thorough and complete mixing of the non-combustible gas, oxygen, and the combustible gas, acetylene, is effected thereby further adding to the efficiency of the device.

Other objects and advantages of my invention will be pointed out in the detailed description thereof which follows or will be apparent from such description.

In order that my invention may be readily understood and its practical advantages fully appreciated and comprehended, reference may be had to the accompanying drawing in which I have illustrated one form of a convenient embodiment thereof. However, it will be understood that changes in the details of construction may be made within the scope of the claims without departing from my invention.

Figure 1:
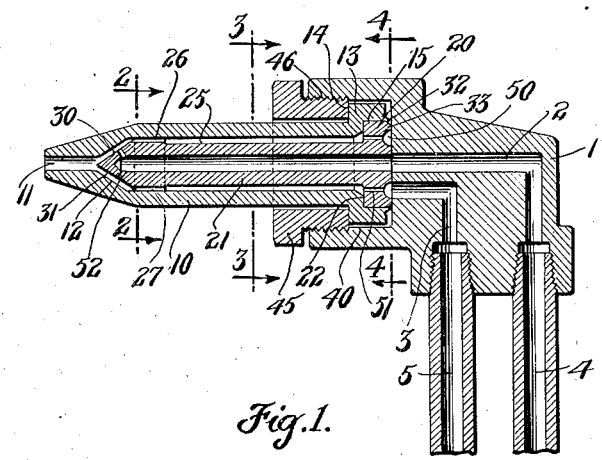
Fig. 1 is a central, longitudinal sectional view of a tip for welding blow pipes constructed in accordance with my invention and also showing in section the head upon which said tip is supported, and also portions of the pipes for supplying gases to the passageways therethrough.
Figure 2:
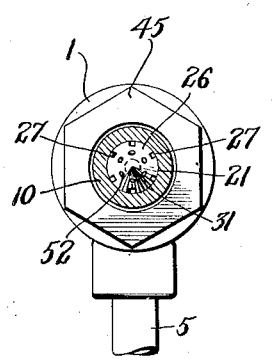
Fig. 2 is a view taken on the line 2—2 of Fig. 1, the outer member of the tip being shown in transverse section and the forward end of the inner member thereof being shown in elevation.
Figure 3:
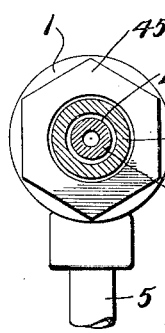
Fig. 3 is a transverse sectional view taken on the line 3—3 of Fig. 2.
Figure 4:
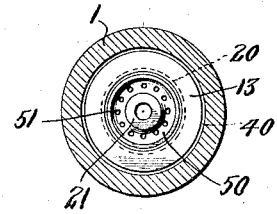
Fig. 4 is a similar view taken on the line 4—4 of Fig. 1.

Referring to the drawing, 1 designates a head having passageways 2 and 3 extending therethrough. Gases are supplied to these passageways 2 and 3 by pipes 4 and 5 having connection with a source of supply, not shown.

The combustible gas, such as acetylene, is supplied through the pipe 4 and passageway 2, while the oxygen or other non-combustible gas which may be employed is supplied through the passageway 3 and the pipe 5.

Referring now to the tip construction to which my invention relates and in which it is embodied, 10 designates an outer tubular member, the forward or front end of which is contracted as indicated and is provided with a relatively small passageway 11 through which the gases, after they have been mixed as will be hereinafter described, are discharged. Intermediate the relatively small outlet or discharge passageway 11 and the main or body portion of the tubular member 10 there is a contracted or cone-shaped section or portion 12. At its rear end the tubular member 11 is provided with an enlarged or head portion 13, the forward side of which constitutes a shoulder 14. An enlarged chamber 15 is provided in the head 13 in which is seated the rear head portion 20 of an inner tubular member 21. The head 20 forms a shoulder 22 with respect to the tubular member 21, which shoulder rests against the rear end of the outer tubular member 10 within the head 13. The tubular member 21 is situated within the outer tubular member 10 and the external diameter thereof throughout the greater portion of its length is substantially less than the internal diameter of the external tubular member 10, whereby an elongated annular space 25 is provided between the outer surface of the member 21 and the interior surface of the tubular member 10. The forward end portion of the tubular member 21 is enlarged as indicated at 26 in the drawing so that it fits snugly the interior of the tubular member 10. The gas which is delivered into the annular space or chamber 25, as will be hereinafter described, is permitted to flow therefrom forwardly through channels or grooves 27 formed in the outer surface of the enlarged portion 26. These channels or grooves terminate in the rear end portion of the cone-shaped mixing chamber 30 formed between the cone-shaped interior surface 12 of the member 10 and the correspondingly shaped surface 31 of the forward end portion of the member 21. These surfaces are spaced from each other as shown in Fig. 1 of the drawing to form the mixing chamber 30. These surfaces are arranged in substantial parallel relation with respect to each other.

The members 10 and 21, after having been assembled, are fastened permanently together by forcing a narrow flange of metal 32 of the rear edge of the head 13 over the rounded surface 33 of the outer rear edge of the head 20 of the member 21. The two members thereby are held firmly together to form a unit. The unit thus formed is secured to the head 1 by inserting the head 13 of the member 10, together with the head 20 of the member 21, into a recess 40 in the forward end portion of the said head. It will be observed that the head 13 is of such diameter that while it enters readily into the recess 40 it fits the same fairly closely. It follows that the diameter of the opening is considerably greater than the external diameter of the tubular member 10. After having inserted the head 13 of the member 10 together with the head 20 of the member 21 into the recess, the tip is detachably fastened to the said head by means of a thimble 45 which encircles the tubular member 10 and when screwed into the recess 40 as indicated at 46, its inner end contacts with the shoulder 14 so as to press the rear flat surface of the head 20 firmly against the flat surface of the bottom of the recess 40. In order that the surface of the head 20 may be pressed against the surface of the bottom of the recess, it will be noted that the said head projects beyond the end of the enlarged or head portion 13 of the member 10.

The central passageway through the tubular member 21, when the tip has been secured to the head of the blow pipe as shown in Fig. 1, is in direct alinement with the forward portion of the passageway 2 through the head 1 and constitutes a continuation thereof.

The non-combustible gas from the passageway 3 through the head 1 is delivered to an annular groove 50 in the rear surface of the head 20 and the latter is connected to the annular elongated space or chamber 25 by means of small passageways 51 through the head 20.

The non-combustible gas flows through the elongated annular chamber or space 25 and through the grooves or channels 27 into the mixing chamber 30. The combustible gas escapes from the tubular member 21 through small discharge openings 52 which extend substantially at right angles to the surface 31 upon the forward end of the inner tubular member 21. It will be seen, therefore, that as the combustible gas is discharged from the openings 52 it is flowing in a direction substantially at right angles to the direction of flow of the non-combustible gas through the mixing chamber 30 which has just previously been delivered from the forward ends of the channels or grooves 27.

It will be seen that a construction embodying my invention provides an elongated annular chamber situated between the inner surface of an external tubular member and the outer surface of an internal tubular member, and that the presence of gas in such annular chamber forms a heat insulating means to prevent the radiation of heat from the external member to the internal member and thence to the combustible gas which may be flowing through the latter. It will also be observed that a thorough and complete mixing and intermingling of the gases within the mixing chamber 30 is effected by reason of the fact that as the gases are discharged into the said chamber they are flowing in directions substantially at right angles to each other. Furthermore, it will be noted that the gas as it issues from the openings 52 is discharged against the surface 12 upon the interior of the member 10, which aids in bringing about a complete and thorough mixing and intermingling of the two gases.

I claim:

1. A tip for blow pipes or torches comprising concentric tubular members to which combustible and non-combustible gases are adapted to be supplied, the inner member constituting the passageway for the combustible gas, the external diameter of the inner member being less than the internal diameter of the outer member whereby an annular elongated chamber is provided intermediate the said members, which chamber is adapted to receive the non-combustible gas whereby the latter constitutes insulating means for the inner member and for the gas flowing therethrough, and the said tip comprising a converging mixing chamber adjacent its forward end into which the gases are discharged from the said inner member and from the said annular chamber, and wherein they are mixed before being discharged from the said tip.

2. A tip for blow pipes or torches comprising concentric tubular members permanently secured together to form a unit, the said tip being adapted to be supplied with combustible and non-combustible gases, the inner member being adapted to constitute the passageway for the combustible gas and the external diameter of which is less than the internal diameter of the outer member, whereby an elongated annular chamber is formed between the external surface of the inner member and the internal surface of the outer member, so that the non-combustible gas which is adapted to be received into and to flow through the said chamber constitutes a heat insulating means for the inner member and the interior surface of the said outer member being contracted adjacent its forward end and the forward end of the said inner tubular member terminating in a cone-shaped portion, the surface of which is situated a distance from and in substantial parallel relation to the contracted surface of the outer member, and the gases from the said inner member and from the said annular chamber being adapted to be discharged into the space formed between the contracted inner surface of the external member and the cone-shaped surface of the end of the inner member wherein they are mixed together.

3. A tip for blow pipes or torches comprising concentric tubular members which are adapted to be permanently secured together to form a unit which is adapted to be interchangeable with other tips which are adapted to be secured to a supporting member, the said tip being adapted to receive combustible and non-combustible gases which flow therethrough, the external diameter of the inner member, being less than the internal diameter of the external member whereby an elongated annular chamber is formed between the said members, the inner member constituting a passageway for the combustible gas and the non-combustible gas flowing through the said annular chamber and forming a heat insulating means for the inner member and the combustible gas flowing therethrough, the inner surface of the outer member being contracted within a region adjacent its forward end and the forward end of the inner member terminating in a cone-shaped portion which portion is situated within the said contracted portion of the outer member and being spaced a distance therefrom to form a mixing chamber, and the said inner member having passageways leading therefrom to the surface of the cone-shaped end portion thereof and extending substantially at right angles to the said surface and to the surface of the said contracted portion, substantially as described.

4. A tip for blow pipes or torches comprising inner and outer tubular members, the outer member having a head portion provided with an enlarged recess and the inner member being provided with a head adapted to fit within the said recess, means for engaging the head upon the said inner member for securing it within the said outer member, and the said inner member being provided at its front end with a head portion provided with channels extending longitudinally therethrough, the said head portion being of a diameter substantially equal to the internal diameter of the outer member and the diameter of the portion of said inner member intermediate the heads at the opposite ends thereof being less than the internal diameter of the outer member, whereby an annular elongated chamber is formed between the said inner and outer members, the said chamber being adapted to receive a gas which flows forwardly therethrough, the said gas constituting an insulating means for the inner tube, and the said tip also comprising a mixing chamber formed adjacent the forward end of the outer member and intermediate a contracted portion of the outer member and the forward cone-shaped end of the inner member.

5. In a blow pipe construction, the combination of a head having gas passageways extending therethrough, said head having a recess therein in the bottom of which the said passageways terminate, a tip having concentric inner and outer tubular members, the outer member having a head provided with a chamber, and the inner member having a head seated in said chamber, the head of the inner member projecting beyond the head of the outer member whereby when the head of said tip is placed within said recess, the outer surface of the head of the inner member is seated directly against the bottom of said recess, means for detachably securing and holding the said tip within said recess, the external diameter of the inner tubular member being less than the internal diameter of the outer tubular member, whereby an annular channel is formed between the said members, and the outer surface of the head upon the inner member being provided with an annular groove into which gas is supplied from one of the passageways in the said head, and the head of the said inner member being provided with openings from the said groove to the said annular channel whereby the said gas may be delivered thereto, and the other passageway through the said inner tube being in direct communication with one of the passageways through the said head, whereby the gas from the latter is delivered directly to the said inner tube, and the said tip being provided with a mixing chamber adjacent its forward end into which the said gases are delivered and wherein they are mixed together.

6. A tip for blow pipes or torches comprising concentric tubular members which are adapted to receive combustible and non-combustible gases, such as acetylene and oxygen, the inner member contacting with the inner surface of the outer member at its rear and front ends, the external diameter of the said inner member between the contacting portions being substantially less than the internal diameter of the outer member, whereby an elongated annular chamber is formed between the said members, the inner member constituting a passageway for the acetylene and the annular chamber constituting a passageway through the tip for the oxygen, and the outer surface of the said inner member adjacent its outer end being provided with channels for the passage of oxygen from the said annular chamber, and the outer member being contracted at its forward end to provide a contracted and converging inner surface portion thereof, and the forward end of the inner member being cone-shaped and terminating within the contracted portion of the said outer member, and openings through the forward end of the said inner member, said openings extending at substantially right angles to the cone-shaped surface of said outer end and delivering the said acetylene into the space between the outer cone-shaped end of the inner member and the opposing contracted inner surface of the outer member, the said space constituting a mixing chamber for the said gases adjacent the outer end of the tip.

7. A tip for blow pipes or torches comprising concentric tubular members to which combustible and oxidizing gases are adapted to be supplied, the inner member constituting the passageway for one of said gases and the outer member the passageway for the other whereby the gas which flows through the outer member surrounds and constitutes an insulating member for the inner member and the gas flowing therethrough, the outer member terminating in a contracted portion having a tapered inner surface, and the inner member terminating in a tapered end portion, the surface of said tapered end portion being concentric with the tapered inner surface of the outer portion, and the said inner member having openings extending substantially at right angles to the said surfaces, the outer ends of said openings terminating in the tapered surface of the terminal end portion of the inner member.

In testimony that I claim the foregoing as my invention I have hereunto signed my name this 11 day of March, A. D. 1920.

ELOF H. MEDÉN.